United States Patent
Wouhaybi et al.

(10) Patent No.: US 10,757,214 B2
(45) Date of Patent: Aug. 25, 2020

(54) CROWD SOURCED ONLINE APPLICATION CACHE MANAGEMENT

(71) Applicant: Intel Corporation, Santa Clara, CA (US)

(72) Inventors: Rita H Wouhaybi, Portland, OR (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 15/039,004

(22) PCT Filed: Dec. 20, 2013

(86) PCT No.: PCT/US2013/077097
§ 371 (c)(1),
(2) Date: May 24, 2016

(87) PCT Pub. No.: WO2015/094356
PCT Pub. Date: Jun. 25, 2015

(65) Prior Publication Data
US 2017/0006130 A1  Jan. 5, 2017

(51) Int. Cl.
*H04L 29/08* (2006.01)
*G06F 11/30* (2006.01)
*G06F 11/34* (2006.01)

(52) U.S. Cl.
CPC ........ *H04L 67/2852* (2013.01); *G06F 11/302* (2013.01); *G06F 11/3037* (2013.01); *G06F 11/3409* (2013.01); *G06F 11/3495* (2013.01); *H04L 67/2833* (2013.01); *G06F 11/3006* (2013.01); *G06F 2201/865* (2013.01); *G06F 2201/885* (2013.01)

(58) Field of Classification Search
CPC ............. H04L 67/2852; H04L 67/2833; G06F 11/302; G06F 11/3037
USPC ................................................. 709/213–214
See application file for complete search history.

(56) References Cited

U.S. PATENT DOCUMENTS 6,381,735 B1 * 4/2002 Hunt ...................... G06F 8/443
714/E11.209
7,516,476 B1   4/2009 Kraemer et al.
(Continued)

FOREIGN PATENT DOCUMENTS

WO   WO-2015094356 A1   6/2015

OTHER PUBLICATIONS

"International Application Serial No. PCT/US2013/077097, International Preliminary Report on Patentability dated Jun. 30, 2016", 6 pgs.

(Continued)

*Primary Examiner* — Minh Chau Nguyen
(74) *Attorney, Agent, or Firm* — Schwegman Lundberg & Woessner, P.A.

(57) ABSTRACT

Systems and techniques for crowd sourced online application management are described herein. A received application and an application cache policy may be identified. Execution of the application may be monitored to determine a behavior characteristic for a subset of application components. A cache policy may be determined for the subset of application components based on the monitoring. A cache improvement plan for the application may be provided based on the cache policy for the subset of application components.

22 Claims, 4 Drawing Sheets

(56) References Cited

U.S. PATENT DOCUMENTS

| | | | |
|---|---|---|---|
| 2001/0034736 A1* | 10/2001 | Eylon | H04L 29/06027 707/999.104 |
| 2002/0161908 A1* | 10/2002 | Benitez | G06F 8/65 709/231 |
| 2005/0165758 A1 | 7/2005 | Kasten et al. | |
| 2006/0064549 A1* | 3/2006 | Wintergerst | G06F 12/121 711/134 |
| 2006/0236033 A1* | 10/2006 | Guinn | G06F 12/0871 711/118 |
| 2007/0179928 A1 | 8/2007 | Basu et al. | |
| 2009/0313438 A1* | 12/2009 | Krishnaprasad | G06F 12/0813 711/133 |
| 2010/0174939 A1 | 7/2010 | Vexler | |
| 2011/0145926 A1 | 6/2011 | Dalcher et al. | |
| 2012/0041914 A1* | 2/2012 | Tirunagari | G06F 12/121 706/15 |
| 2012/0131572 A1 | 5/2012 | Shae et al. | |
| 2012/0210066 A1 | 8/2012 | Joshi et al. | |
| 2012/0226738 A1* | 9/2012 | Taneja | H04L 67/34 709/203 |
| 2013/0074051 A1 | 3/2013 | Freeman | |
| 2013/0185488 A1* | 7/2013 | Talagala | G06F 12/0246 711/103 |
| 2013/0226992 A1* | 8/2013 | Bapst | H04L 67/42 709/203 |
| 2013/0325856 A1 | 12/2013 | Soto Matamala et al. | |
| 2014/0143647 A1* | 5/2014 | Reshadi | G06F 17/30902 715/234 |
| 2014/0172944 A1* | 6/2014 | Newton | H04L 41/0893 709/202 |
| 2014/0177497 A1* | 6/2014 | Backholm | H04W 52/0232 370/311 |
| 2014/0258370 A1* | 9/2014 | Bares | H04L 67/42 709/203 |
| 2014/0281153 A1* | 9/2014 | Mehrotra | G06F 12/0866 711/103 |

OTHER PUBLICATIONS

"European Application Serial No. 13899612.9, Response filed Jan. 3, 2018 to Extended European Search Report dated Jul. 4, 2017", 17 pgs.

"International Application Serial No. PCT/US2013/077097, International Search Report dated Aug. 29, 2014", 3 pgs.

"International Application Serial No. PCT/US2013/077097, Written Opinion dated Aug. 29, 2014", 4 pgs.

"European Application Serial No. 13899612.9, Extended European Search Report dated Jul. 4, 2017", w/ English Translation, 7 pgs.

\* cited by examiner

CROWD SOURCED ONLINE APPLICATION CACHE MANAGEMENT

This patent application is a U.S. National Stage Application under 35 U.S.C. 371 from International Application PCT/US2013/077097, filed Dec. 20, 2013, published as WO 2015/094356, which is hereby incorporated by reference in its entirety.

TECHNICAL FIELD

Embodiments described herein generally relate file caching and more specifically to crowd sourced online application cache management.

BACKGROUND

Online (e.g., network-based) applications may entail the request and retrieval of files from a remote machine to a local machine prior to executing the application. Caching is a mechanism whereby a local copy of these remote files may be kept in order to reduce network overhead and delay in file retrieval. The World Wide Web Consortium (W3C) Hypertext Markup Language version 5 (HTML5) definition—which may be used to implement online applications, for example, in a web browser—has added a cache feature called AppCache. AppCache defines a cache manifest file in which HTML5 files may be designated as 'cache', 'network', and 'fallback'. The 'cache' designation indicates that a file should be cached. The 'network' designation indicates that the file should be retrieved from the network (i.e., not cached). The 'fallback' designation indicates an offline alternative for a corresponding online file (e.g., for when the network is unavailable). Crowd sourcing includes soliciting contributions from a group of users, such as an online community, to solve a problem.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Cache policies may define a variety of factors in file caching. For example, cache policies may define what files are cached, for how long the files are cached, where the files are cached, etc. The Appcache manifest file is an example of a mechanism to define a cache policy. Because online applications may comprise a multitude of files, and cache policies may have several factors for each file, composing cache policies may be complex. Moreover, the tradeoffs between cache overhead vs. network overhead, security considerations, etc. often entail specialized knowledge by a cache policy author in order to create an effective cache policy. Further, as online application toolsets, such as those implementing HTML5, allow developers with less understanding of the underlying implementation details to craft online applications, the developers may lack the specialized knowledge to create effective cache policies. These developers may avoid confronting these complexities by using a cache policy that either caches nothing, or everything. Moreover, to further reduce complexity, the developer may reduce the number of files by combining files into packages and providing a package-wide cache policy. Although these strategies may be easier for the developer, they may lead to under-utilization of the available cache mechanism. This, in turn, may impact the user's experience using the online application by increasing response time (e.g., due to network overhead and load times) or increasing resource utilization (e.g., network bandwidth to continually load files which may lead to increased charges for metered bandwidth).

Crowd sourced online application cache management may help create effective cache policies while easing the planning and knowledge requirements for developers by providing accurate guidelines based on real usage. For clarity, the following text and examples are in the context of a user interacting with an HTML5 application via a web browser. However, the principles are generally equally applicable to any online application with a component that executes on a user device.

Crowd sourced online application cache management may include one or more components that may observe local execution of the online application. As used herein, "local" refers to the executing portions of the online application on a user's device as opposed to machines remote from the user, such as the cloud. The observations may include network and application component use. In an example, individual portions of a single application component may also be observed. The observations may also include security concerns for an element under observation. The observations may be used to create a cache policy based on the element behaviors. This cache policy may be implemented locally to create a dynamic cache policy that is specific to the user.

In an example, the one or more components may provide a cache improvement plan, to a developer platform for example, to facilitate the creation of an effective cache policy for the application. In an example, multiple cache improvement plans from multiple users may be aggregated to create an aggregate cache policy. In an example, users may be grouped based on behavior such that a cache policy may be tailored to the group. In an example, the cache improvement plan may include a subdivision of an application component.

Providing a cache policy based on user's use of the online application relieves the developer from the complexities inherent in creating or updating such a policy. Further, observing sub-components of the application and providing a recommendation to divide the component into sub components introduces a further efficiency by possibly allowing more material to be cached—e.g., between two sub-components, one cacheable and the other not, the component shouldn't be cached whereas the division of the sub-components into separate components permits the caching of the cacheable component.

Figure 1:
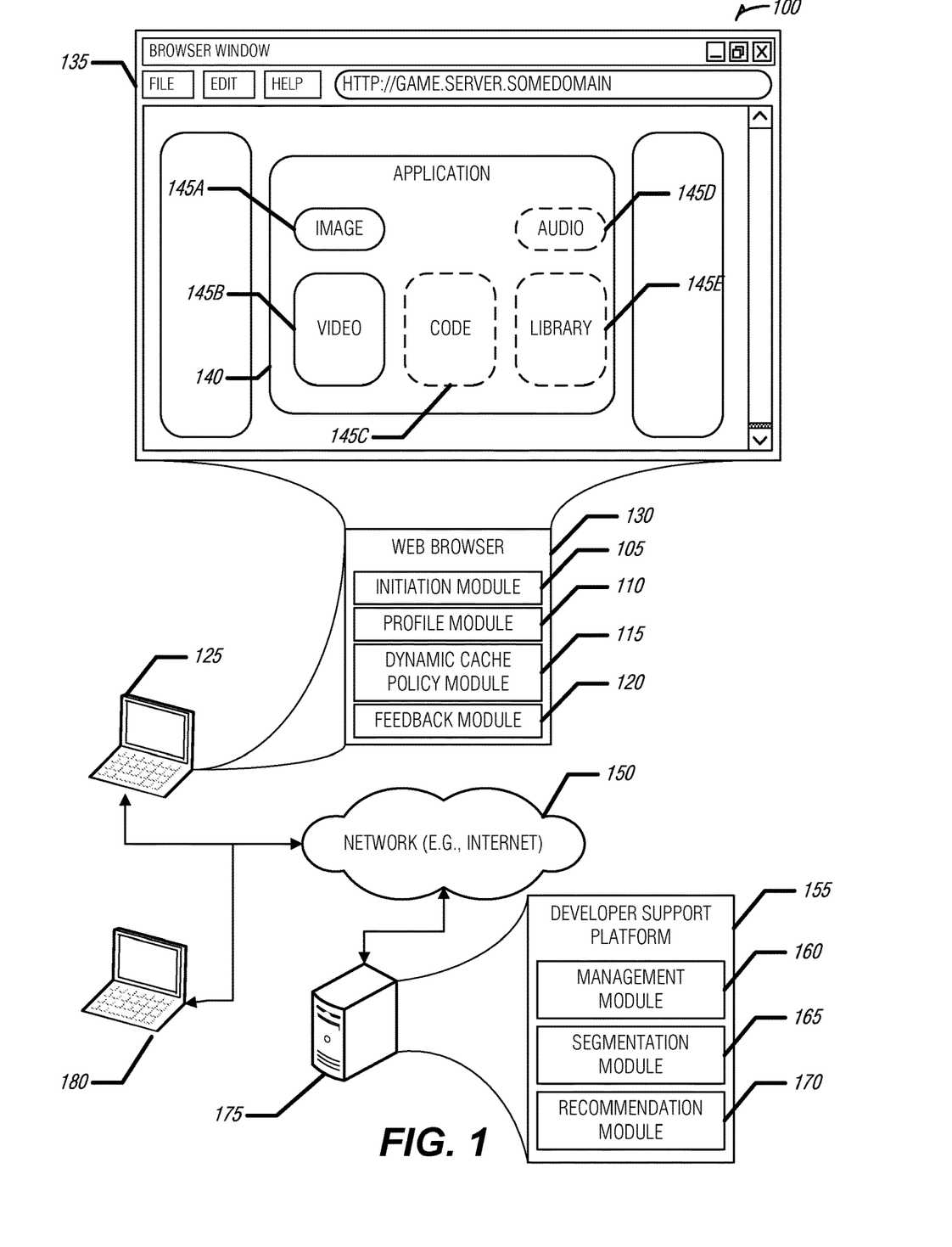
FIG. 1 is a block diagram of an example of a system for crowd sourced online application cache management, according to an embodiment.

FIG. 1 is a block diagram of an example of a system 100 for crowd sourced online application cache management.

The system 100 may include an initiation module 105, a profile module 110, a dynamic cache policy module 115, and a feedback module 120. These modules may be collectively referred to as a cache policy engine. The cache policy engine may be a part of, or an add-on (e.g., plug-in) operably coupled to, an application runtime environment (ARE) 130 (e.g., a web browser, script engine, operating system (OS), etc.) on a user device 125. The ARE 130 may be arranged to render (e.g., present) application content 145A-E for an application 140 in a display area 135 (e.g., a window on a windowing system). The user device 125 may be communicatively coupled to a network 150 to communicate with remote machines, including the remote content of the application 140.

The initiation module 105 may be arranged to identify the received application 140 and an application cache policy. In an example, the application 140 includes an indication that the application is flagged for cache policy improvement. In an example, the identification may be made via this indication. For example, the application developer—or, in an example, an end-user-puts the application 140 into a crowd sourced caching policy mode which includes the indication. The initiation module 105 reads the mode indication when the application 140 is loaded and identifies the application 140 for evaluation. In an example, the indication is within the cache policy that is part of the application 140.

The profile module 110 may be arranged to monitor execution of the application 140 to determine a behavior characteristic for a subset of application components 145. In an example, the monitoring may include identifying components 145 of the application 140. In an example, identifying the components 145 of the application 140 may include identifying discrete data types within the application 140. In an example, the discrete data types may include at least one of an image 145A, an audio segment 145D, a video 145B, code 145C, or a library 145E (application components illustrated with dashed lines are not usually visible when rendered in the display area 135). Generally, the code 145C is differentiated from the library 145E by the way in which it is packaged or referenced in the application 140. For example, the code 145C is generally software used to start and manage the application 140, whereas the library 145E is referenced from within the code 145C (or elsewhere in the application 140) and is loaded via an additional network call. For example, a script may be embedded within an HTML page and represent the code 145C. In this example, the script may include a reference to an external library 145E for parsing dates. The reference may cause the web browser 130 to request the library 145E and load it such that the code 145C may use the library 145E to parse a date.

In an example, identifying the components 145 may include identifying portions of discrete data types as a component (e.g., sub-components). In an example, the discrete data type may be programming code (e.g., code 145C) and the portions are code blocks within the programming code. For example, the profile module 110 may integrate with an interpreter that is executing the application 140 in the web browser 130. The profile module 110 may parse the application code 145C and identify function or method calls, data structures, etc. within the code 145C as subcomponents. These subcomponents may be treated as any other application component 145 for subsequent operations.

In an example, the behavior characteristic may include a frequency at which the subset of components is used. For example, each time a given component 145 is executed, referred to, etc. during the program 140 execution, a counter may be incremented. The counter may be sampled at an interval (e.g., every tenth of a second) or in response to an event (e.g., the application 140 is terminating). In an example, the behavior characteristic may include a frequency at which the subset of components changes. For example, the previously described counter may be decremented each time a component changes. Examples of change may include, changed data (e.g., within a data structure), changed status (e.g., a user authentication object), among others. In an example, a separate change counter may be maintained for each given component 145A-E or for the entire subset of components 145.

In an example, the behavior characteristic may include a security concern. In an example, the security concern may be accepted from a user interface by a user. For example, the profile module 110 may identify a data structure in the code 145C as including sensitive user information, such as a password, credit-card number, etc. and alert the user via a dialog. The user may indicate that she does not want the sensitive information to be cached (e.g., because the machine is a public kiosk). The code 145C, or even just the data structure, may be flagged as including a security concern if it is cached.

In an example, the security concern may include identification of a network location (e.g., domain, network, URL, etc.) from which the application 140 is loaded (e.g., content is downloaded). For example, a user may navigate to a website of questionable character whereby the application 140 may be automatically downloaded and executed by the web browser 130. The user may be prompted as to whether the application 140 should be allowed to cache files. Because this site may have malicious intentions, the user may opt not to cache anything to prevent a malicious component 145 from being used at a later time (e.g., such as at a different site hosting the same application). In an example, the network location may be identified as a security concern from a second application executing on the user device 125. For example, a security programming may have the network location HTTP://GAME.SERVER.SOMEDOMAIN in a blacklist of malicious sites. The security program may provide an indication of the status of this network location to the profile module 110 which may, in turn, register the security concern. Example reasons to classify a location as a security concern may include reputation (e.g., who is or who has operated the location), a threat report (e.g., from a research institution), behavioral characteristics of the location or software emanating from the location, etc.

The dynamic cache policy module 115 may be arranged to determine a cache policy for the subset of application components based on the monitoring. In an example, determining the cache policy for the subset of application components may include determining to cache the subset of applications components based on a determination that it is not less efficient, or accurate, from at least one of a network resource or computational resource perspective to cache the subset of application components. For example, if the subset of application components are frequently used but don't change, such a static image 145A, it is inefficient use of the network to download the image 145A each time that it is used; thus, the image 145A will be cached. Conversely, a video 145B that changes frequently, such as in an application where a different video is displayed every five seconds, the overhead in determining whether or not the cache is fresh may waste network resources because it is in addition to the necessary network resources to download each video 145B; thus, the video 145B will not be cached.

In an example, determining the cache policy for the subset of application components may include overriding any determination to cache the subset of components based on a determination that a security status of the subset of application components is beyond a security threshold. Example security statuses may be numeric (e.g., integers 1-10), a alpha numeric (e.g., high, medium, low, etc.). Thus, a threshold of "medium" may set in which medium or high level statuses are beyond the threshold and a status of low is not. In this example, security concerns may trump efficient use of computational or network resources. The security threshold provides a baseline at which security concerns may override efficiency concerns. In an example, the security threshold may be set by the developer in the application 140. In an example, the security threshold may be dynamically determined via a security program or service available to the dynamic cache policy module 115.

In an example, the dynamic cache policy module 115 may be arranged to store the determined cache policy on the user device 125. In an example, the dynamic cache policy module 115 may be arranged to implement the determined cache policy. Thus, the cache policy may be honed over time in response to the application's behavior. Further, the cache policy may address a change in the application's user base and the subsequent use of the application 140 by that user base.

The feedback module 120 may be arranged to provide a cache improvement plan for the application 140 based on the cache policy for the subset of application components. In an example, the cache improvement plan may include a division of the application 140 into a plurality of sets of application components 145 including the subset of application components. The division may be based on at least one of use of an application component 145 (e.g., frequency the component 145 is used) or variability (e.g., frequency that the component 145 changes). For example, for ease of deployment, or other reasons, the application 140 may be delivered to the user device 125 as a single file. Within this file may be several application components 145. The previously described subcomponent determination may be made and each of these treated as individual components 145 for the determination of the cache policy. The determined cache policy may cache half of the components and not the other half. Thus, the cache improvement plan may divide the application 140 from one file into two files such that one file may be cached while the other is not cached.

In an example, providing the cache improvement plan may include aggregating a plurality of cache policies for the subset of application components. For example, the feedback module 120 may store a determined cache policy from each execution of the application 140. These individual determined cache policies may be provided as a data bundle to provide a more robust dataset for cache policy analysis. In an example, the aggregating may include combining the plurality of cache policies to create an aggregate cache policy for the subset of application components. For example, if after five executions of the application 140, the determined cache policies indicate that a third of the application components 145 should be cached, a third should not be cached, and the remaining third have yielded different cache determinations at each execution. Thus, the aggregate cache policy may cache the first third, not cache the second third, and, for example, average the remaining third to determine whether or not to cache them. In an example, the cache management plan is provided to the user (e.g., end-user) running the application (e.g., as opposed to the developer). In this example, the user may address cache problems themselves using the described crowd sourced online application cache management.

In an example, providing the cache improvement plan may include transmitting the cache improvement plan to a developer accessible network location, such as the developer support platform 155 on the machine 175 via the network 150. In providing the cache improvement plan to the developer, the developer may use the cache improvement plan, or parts thereof, as a cache policy for the application 140 going forward. This may improve the application's user experience without burden upon the developer.

The system 100 may also include a developer support platform 155. In an example, the developer support platform 155 may reside on a network accessible server 175, or other machine (e.g., a cloud service). The developer support platform 155 may include a management module 160, a segmentation module 165, and a recommendation module 170. In an example, one or more elements of the developer support platform 155 capabilities may be included in a user support platform residing on the user device 125. The user support platform may thus allow a user to achieve the benefits of crowd sourced cache policy management.

The management module 160 may be arranged to receive the cache improvement plan.

The segmentation module 165 may be arranged to provide a recommended modification to the application. In an example, the modification may include dividing the application into a plurality of files. Thus, the segmentation module 165 addresses the usual cache policy limit of caching based on a file and not a smaller unit. The recommended division permits a monolithic file, for example, to be split based on cache efficiency without imparting much burden to the developer.

The recommendation module 170 may be arranged to create a crowd-sourced cache improvement plan from a plurality of cache improvement plans. The plurality of cache improvement plans may come from the management module's 160 receipt of the plurality of cache improvement plans from a plurality of users (e.g., via user device 125 and a second user device 180). Similarly to the individual user cache policy aggregation described above, the use of cache improvement plans from multiple users may be used to refine a generalized cache policy, or a set of policies, for the application 140.

In an example, the crowd-sourced cache improvement plan may be derived from a subset of the plurality of users and respective cache improvement plans. The subset may be selected based on a user behavior characteristic. Thus, while a good generalized cache policy as described above improves upon the likely poor cache policy crafted from a developer, identifiable groups of users may benefit more from individualized cache policies. In an example, identifying the group may include identifying user's whose cache improvement plans are within a threshold of each other. Thus, the previously described monitoring may identify groups of individuals based on the respective determined cache policies being similar. In an example, demographic information, such as location of the user device 125, subject of the application 140 (e.g., from where was the application 140 downloaded), etc. may be used to group users. The use of the demographic information permits users that do not produce cache improvement plans to be appropriately grouped. In an example, the groupings may be based on user identified security sensitivities (e.g., secure, permissive, etc.). In an example, the groupings may be based on other identifiable parameters, such as device type, device make, network provider, etc.

The system 100, as described above, provides a flexible and powerful tool to create effective cache policies without burdening the developer with learning how to create these policies herself. Further, the developer could test the application 140 with different devices (desktops, phones, tablets, etc.) to simulate user experiences in order to optimize and validate before they release the application 140 to real end-users. In an example, a testing module may include a number of environment modules to enable simulations without human users. For example, an environment module may simulate a user interacting with the application 140 on a mobile device from a roaming cellular connection. A second environment module may simulate that same user interacting with the application 140 at 11:00 PM on a Sunday night from a desktop computer over a high-speed data connection. The testing module may be arranged to manage (e.g., including create or provide the interfaces for the developer to create) the environment modules. The testing module may also be arranged to implement a test plan whereby the environment modules are selected and applied to the application 140 in order to develop cache policies as described above.

The developer may also occasionally put the application 140 back in the "Crowd Sourced Caching Policy" mode in order to validate, or change, an existing cache policy. This last part may be helpful when the developer changes the application 140 significantly, when different types of users (e.g., in different part of the world) start using the application 140, or even when providers change their systems (e.g., which may affect the overall performance of the application 140). If the existing cache policies need adjustment, then the developer may be alerted with a set of recommendations, for example, from the feedback module 120, the segmentation module 165, or the recommendation module 170.

Figure 2:
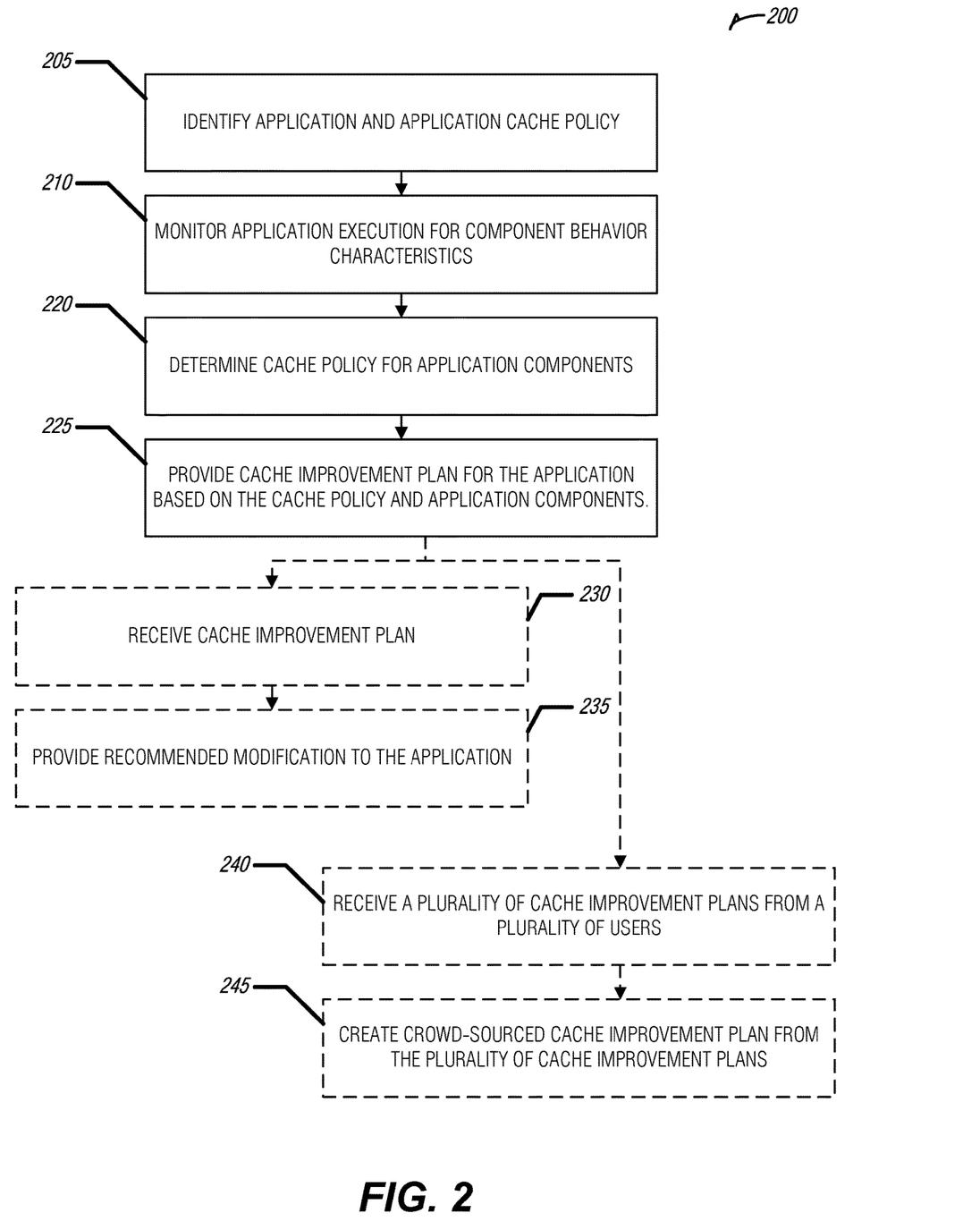
FIG. 2 illustrates a flow diagram of an example of a method for crowd sourced online application cache management, according to an embodiment.

FIG. 2 illustrates a flow diagram of an example of a method 200 for crowd sourced online application cache management. The operations of the method 200 may be performed by any number of machine components, including any or all of those described above with respect to FIG. 1.

At operation 205, a received application and an application cache policy may be identified. In an example, identifying the received application may include receiving an indication from the application that it is flagged for cache policy improvement.

At operation 210, execution of the application may be monitored to determine a behavior characteristic for a subset of application components. In an example, monitoring the execution of the application may include identifying components of the application. In an example, identifying the components of the application may include identifying discrete data types or content within the application. In an example, the discrete data types may include at least one of an image, an audio segment, a video, code, or a library. In an example, identifying the components of the application may include identifying portions of a discrete data type as a component. In an example, the discrete data type is a programming code and the portions are code blocks within the programming code.

In an example, the behavior characteristic may include a frequency at which the subset of components is used. In an example, the behavior characteristic may include a frequency at which the subset of components changes. In an example, the behavior characteristic may include a security concern. In an example, the security concern may be accepted from a user interface by a user. In an example, the security concern may be accepted from a security application on a machine executing the application. In an example, the security concern may include identification of a network location from which the application is loaded.

At operation 220, a cache policy for the subset of application components may be determined based on the monitoring of operation 210. In an example, determining the cache policy for the subset of application components may include determining to cache the subset of applications components based on a determination that it is not less efficient from at least one of a network resource or computational resource perspective to cache the subset of application components. In an example, determining the cache policy for the subset of application components may include overriding any determination to cache the subset of components based on a determination that a security status of the subset of application components is beyond a security threshold.

At operation 225, a cache improvement plan may be provided for the application based on the cache policy for the subset of application components and the application cache policy. In an example, the cache improvement plan may include a division of the application into a plurality of sets of application components. The division may be based on at least one of use of an application component or variability of the application component. In an example, providing the cache improvement plan may include aggregating a plurality of cache policies for the subset of application components. In an example, the aggregating may include combining the plurality of cache policies to create an aggregate cache policy for the subset of application components. In an example, providing the cache improvement plan may include transmitting the cache improvement plan to a developer accessible network location At operation 230, optionally, the cache improvement plan may be received, for example, at a device, or machine-based service.

At operation 235, optionally, a recommended modification to the application may be provided. The modification may include dividing the application into a plurality of files.

At operation 240, optionally, a plurality of cache improvement plans may be received from a plurality of users.

At operation 245, optionally, a crowd-sourced cache improvement plan may be created from the plurality of cache improvement plans. In an example, the crowd-sourced cache improvement plan may be derived from a subset of the plurality of users and respective cache improvement plans. In an example, the subset may be selected based on a user behavior characteristic.

Figure 3:
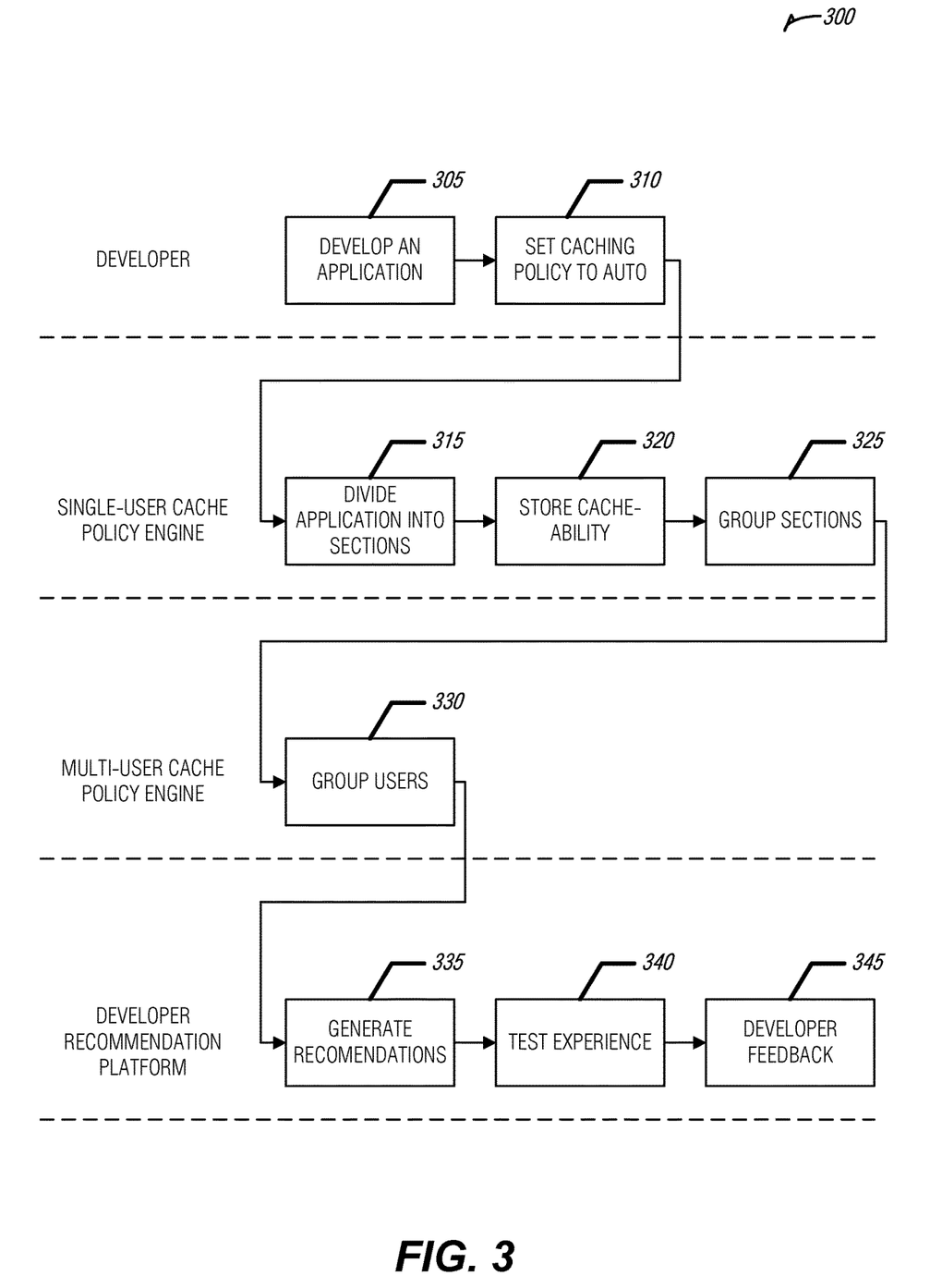
FIG. 3 illustrates a flow diagram of an example of a scenario for crowd sourced online application cache management, according to an embodiment.

FIG. 3 illustrates a flow diagram of an example of a scenario 300 for crowd sourced online application cache management. Any of the previously described components or operations may be used to implement the various elements of the scenario 300. As illustrated, the elements above a horizontal dashed line are performed by the entity listed on the left. While FIG. 3 illustrates a developer-side perspective of the crowd sourced aspects of the cache policy management, in an example, these capabilities may reside on a user device and allow individual users to leverage the crowd sourced cache policy management techniques without necessarily involving the developer.

At 305, the developer develops an HTML5 application.

At 310, the developer sets the cache policy of the application to automatic (a type of mode described above).

At 315, the divide each part of the HTML5 application into multiple sections and assign an ID to each part based on: section id: <file, section, content URI (Uniform Resource Identifier), security status>.

At 320, for each network access that the application generates, create a record as follows: section id, URI access, time, duration of download, previous URI access, security status, changed status from the previous access to the section ID. Content could change and something that used to change very frequently might become static or something that used to be static is may become more dynamic. Periodically evaluating the content may determine how suitable it is to cache the content. The usage may be generated by users or bots (e.g., environment modules of the testing module described above).

At 325, group the records based on Section id, URI accessed, and security status. For each group, evaluate the frequency of access based on tracking session ids and whether the content was unchanged. If the content was unchanged, between at least 2 simultaneous accesses, increment the cacheable score by 1. If the content was changed, then decrement cacheable by 1. If the content's security status was marked as negative by a user, decrease the cacheable score by 1. The system may track the security status separately which would help profiling a set of users as security-conscious or not and their level of discomfort in relation to compromises to the web browser cache. Group all records with a cacheable score greater than 1, by their section ids. If for a section, the cumulative score is higher than a certain threshold τ, mark it as a candidate for caching. For each section that is marked as a candidate for caching, count the number of accesses that obtained a cacheable score of 0. Highlight these sub-sections since they might invalidate the caching policy and require constant access to the network.

At 330, from each user, rank the section by their score in descending order and divide the sections into at least 3 categories:
  a. High score value
  b. Medium score value
  c. Very low score value including zero Group similar users based on the sections in each of the categories. Rank groups by the number of users in each in descending order. In an example, collaborative filtering may be used to group the users. In an example, collaborative filtering may replace the mechanism described here.

At 335, create recommendations to the developer showing the parts in the High-Score category while highlighting any exceptions there that they might need to restructure, remove, or treat as an exception. The recommendation for these would be to cache.

At 340, once the developer adjusts their AppCache policy, allow them to test their app using the new policy in order to make sure that the experience (responsiveness, efficiency, etc.) is still acceptable. They can then do the same procedure in the second category until they feel that they have maximized their optimizations.

At 345, If the experience suffers, then the developer could note that and the system may backtrack, lower the caching, and repeat the test. In an example, the user may provide feedback, for example, indicating poor performance or stale data. In an example, the user provided feedback may initiate the back-tracking, or other, reevaluation of the cache policy.

Figure 4:
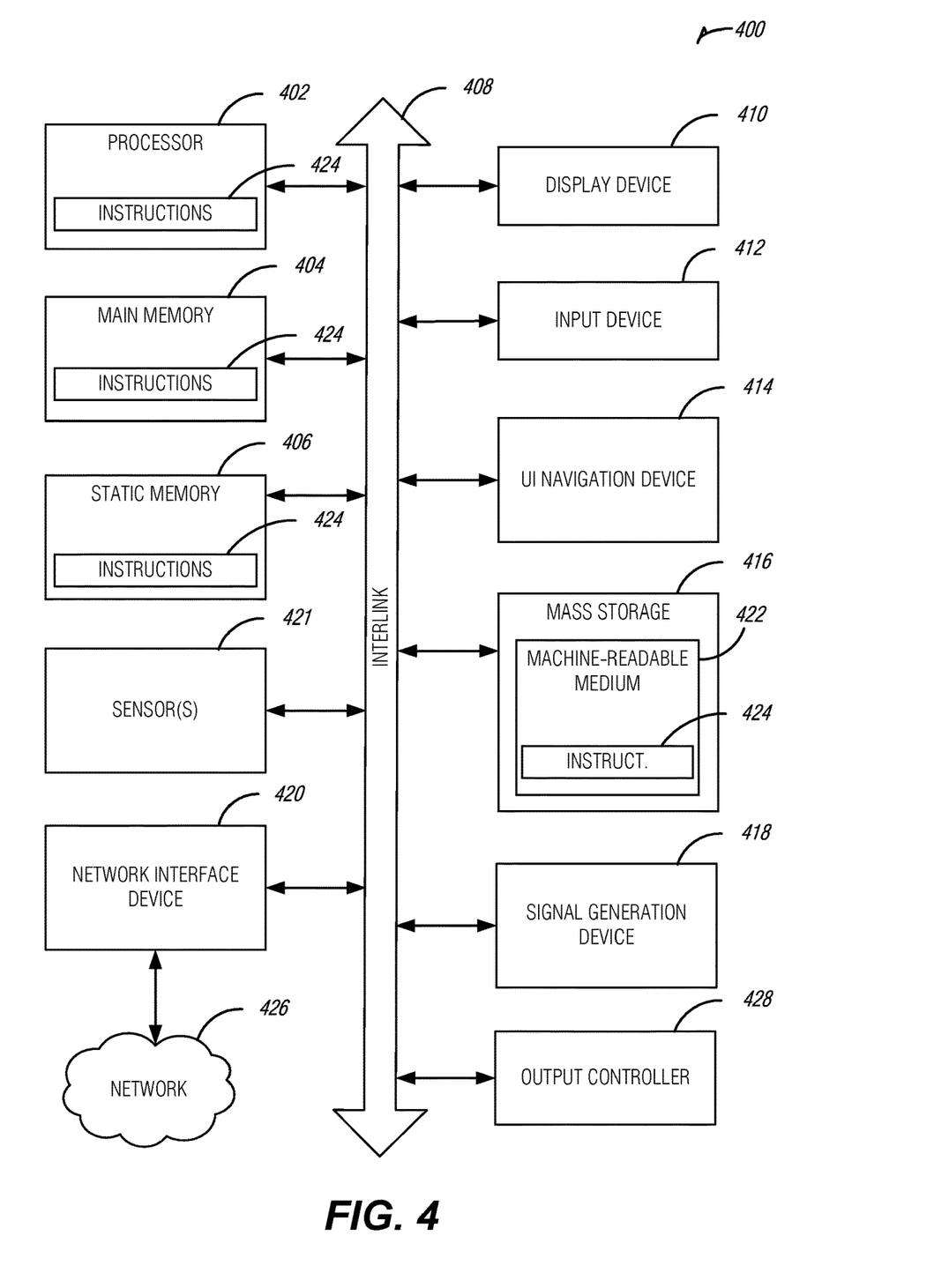
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 may include subject matter (such as a device, apparatus, or a system for crowd sourced online application cache management) comprising: an initiation module to identify a received application and an application cache policy; a profile module to monitor execution of the application to determine a behavior characteristic for a subset of application components; a dynamic cache policy module to determine a cache policy for the subset of application components based on the monitoring; and a feedback module to provide a cache improvement plan for the application based on the cache policy for the subset of application components.

In Example 2, the subject matter of Example 1 may include, wherein to identify the received application includes receiving an indication from the application that it is flagged for cache policy improvement.

In Example 3, the subject matter of any of Examples 1-2 may include, wherein to monitor the execution of the application includes identifying components of the application.

In Example 4, the subject matter of any of Examples 1-3 may include, wherein to identify the components of the application includes identifying discrete data types or content sources within the application.

In Example 5, the subject matter of any of Examples 1-4 may include, wherein the discrete data types include at least one of an image, an audio segment, a video, code, or a library.

In Example 6, the subject matter of any of Examples 1-5 may include, wherein to identify the components of the application includes identifying portions of a discrete data type as a component.

In Example 7, the subject matter of any of Examples 1-6 may include, wherein the discrete data type is a programming code and the portions are code blocks within the programming code.

In Example 8, the subject matter of any of Examples 1-7 may include, wherein the behavior characteristic includes a frequency at which the subset of components are used.

In Example 9, the subject matter of any of Examples 1-8 may include, wherein the behavior characteristic includes a frequency at which the subset of components change.

In Example 10, the subject matter of any of Examples 1-9 may include, wherein the behavior characteristic includes a security concern.

In Example 11, the subject matter of any of Examples 1-10 may include, wherein the security concern is accepted from a user interface by a user.

In Example 12, the subject matter of any of Examples 1-11 may include, wherein the security concern is accepted from a security application on a machine executing the application.

In Example 13, the subject matter of any of Examples 1-12 may include, wherein the security concern includes identification of a network location from which the application is loaded.

In Example 14, the subject matter of any of Examples 1-13 may include, wherein to determine the cache policy for the subset of application components includes determining to cache the subset of applications components based on a determination that it is not less efficient from at least one of a network resource or computational resource perspective to cache the subset of application components.

In Example 15, the subject matter of any of Examples 1-14 may include, wherein to determine the cache policy for the subset of application components includes overriding any determination to cache the subset of components based on a determination that a security status of the subset of application components is beyond a security threshold.

In Example 16, the subject matter of any of Examples 1-15 may include, wherein the cache improvement plan includes a division of the application into a plurality of sets of application components including the subset of application components, the division based on at least one of use of an application component or variability of the application component.

In Example 17, the subject matter of any of Examples 1-16 may include, wherein to provide the cache improvement plan includes aggregating a plurality of cache policies for the subset of application components.

In Example 18, the subject matter of any of Examples 1-17 may include, wherein the aggregating includes combining the plurality of cache policies to create an aggregate cache policy for the subset of application components.

In Example 19, the subject matter of any of Examples 1-18 may include, wherein to provide the cache improvement plan includes transmitting the cache improvement plan to a developer accessible network location.

In Example 20, the subject matter of any of Examples 1-19 may include, a developer support platform, the developer support platform including: a management module to receive the cache improvement plan; and a segmentation module to provide a recommended modification to the application, the modification including dividing the application into a plurality of files, a subset of the plurality of files corresponding to the subset of application components.

In Example 21, the subject matter of any of Examples 1-20 may include, a recommendation module to create a crowd-sourced cache improvement plan from a plurality of cache improvement plans, wherein the management module is to receive the plurality of cache improvement plans from a plurality of users, the cache improvement plan being one of the plurality of cache improvement plans.

In Example 22, the subject matter of any of Examples 1-21 may include, wherein the crowd-sourced cache improvement plan is derived from a subset of the plurality of users and respective cache improvement plans, the subset selected based on a user behavior characteristic.

Example 23 may include, or may optionally be combined with the subject matter of any one of Examples 1-22 to include, subject matter (such as a method, means for performing acts, or machine readable medium including instructions that, when performed by a machine cause the machine to performs acts) for crowd sourced online application cache management comprising: identifying a received application and an application cache policy; monitoring execution of the application to determine a behavior characteristic for a subset of application components; determining a cache policy for the subset of application components based on the monitoring; and providing a cache improvement plan for the application based on the cache policy for the subset of application components.

In Example 24, the subject matter of Example 23 may include, wherein identifying the received application includes receiving an indication from the application that it is flagged for cache policy improvement.

In Example 25, the subject matter of any of Examples 23-24 may include, wherein monitoring the execution of the application includes identifying components of the application.

In Example 26, the subject matter of any of Examples 23-25 may include, wherein identifying the components of the application includes identifying discrete data types within the application.

In Example 27, the subject matter of any of Examples 23-26 may include, wherein the discrete data types include at least one of an image, an audio segment, a video, code, or a library.

In Example 28, the subject matter of any of Examples 23-27 may include, wherein identifying the components of the application includes identifying portions of a discrete data type as a component.

In Example 29, the subject matter of any of Examples 23-28 may include, wherein the discrete data type is a programming code and the portions are code blocks within the programming code.

In Example 30, the subject matter of any of Examples 23-29 may include, wherein the behavior characteristic includes a frequency at which the subset of components are used.

In Example 31, the subject matter of any of Examples 23-30 may include, wherein the behavior characteristic includes a frequency at which the subset of components change.

In Example 32, the subject matter of any of Examples 23-31 may include, wherein the behavior characteristic includes a security concern.

In Example 33, the subject matter of any of Examples 23-32 may include, wherein the security concern is accepted from a user interface by a user.

In Example 34, the subject matter of any of Examples 23-33 may include, wherein the security concern is accepted from a security application on a machine executing the application.

In Example 35, the subject matter of any of Examples 23-34 may include, wherein the security concern includes identification of a network location from which the application is loaded.

In Example 36, the subject matter of any of Examples 23-35 may include, wherein determining the cache policy for the subset of application components includes determining to cache the subset of applications components based on a determination that it is not less efficient from at least one of a network resource or computational resource perspective to cache the subset of application components.

In Example 37, the subject matter of any of Examples 23-36 may include, wherein determining the cache policy for the subset of application components includes overriding any determination to cache the subset of components based on a determination that a security status of the subset of application components is beyond a security threshold.

In Example 38, the subject matter of any of Examples 23-37 may include, wherein the cache improvement plan includes a division of the application into a plurality of sets of application components including the subset of application components, the division based on at least one of use of an application component or variability of the application component.

In Example 39, the subject matter of any of Examples 23-38 may include, wherein providing the cache improvement plan includes aggregating a plurality of cache policies for the subset of application components.

In Example 40, the subject matter of any of Examples 23-39 may include, wherein the aggregating includes combining the plurality of cache policies to create an aggregate cache policy for the subset of application components.

In Example 41, the subject matter of any of Examples 23-40 may include, wherein providing the cache improvement plan includes transmitting the cache improvement plan to a developer accessible network location.

In Example 42, the subject matter of any of Examples 23-41 may include: receiving the cache improvement plan; and providing a recommended modification to the application, the modification including dividing the application into a plurality of files, a subset of the plurality of files corresponding to the subset of application components.

In Example 43, the subject matter of any of Examples 23-42 may include: receiving a plurality of cache improvement plans from a plurality of users, the cache improvement plan being one of the plurality of cache improvement plans; and creating a crowd-sourced cache improvement plan from the plurality of cache improvement plans.

In Example 44, the subject matter of any of Examples 23-43 may include, wherein the crowd-sourced cache improvement plan is derived from a subset of the plurality of users and respective cache improvement plans, the subset selected based on a user behavior characteristic.

Example 45 may include, or may optionally be combined with the subject matter of any one of Examples 1-44 to include subject matter (such as a device, apparatus, or a system for crowd sourced online application cache management) comprising: initiation means to identify a received application and an application cache policy; profile means to monitor execution of the application to determine a behavior characteristic for a subset of application components; cache policy means to determine a cache policy for the subset of application components based on the monitoring; and feedback means to provide a cache improvement plan for the application based on the cache policy for the subset of application components.

In Example 46, the subject matter of Example 45 may include, wherein to identify the received application includes receiving an indication from the application that it is flagged for cache policy improvement.

In Example 47, the subject matter of any of Examples 45-46 may include, wherein to monitor the execution of the application includes identifying components of the application.

In Example 48, the subject matter of any of Examples 45-47 may include, wherein to identify the components of the application includes identifying discrete data types within the application.

In Example 49, the subject matter of any of Examples 45-48 may include, wherein the discrete data types include at least one of an image, an audio segment, a video, code, or library.

In Example 50, the subject matter of any of Examples 45-49 may include, wherein to identify the components of the application includes identifying portions of a discrete data type as a component.

In Example 51, the subject matter of any of Examples 45-50 may include, wherein the discrete data type is a programming code and the portions are code blocks within the programming code.

In Example 52, the subject matter of any of Examples 45-51 may include, wherein the behavior characteristic includes a frequency at which the subset of components are used.

In Example 53, the subject matter of any of Examples 45-52 may include, wherein the behavior characteristic includes a frequency at which the subset of components change.

In Example 54, the subject matter of any of Examples 45-53 may include, wherein the behavior characteristic includes a security concern.

In Example 55, the subject matter of any of Examples 45-54 may include, wherein the security concern is accepted from a user interface by a user.

In Example 56, the subject matter of any of Examples 45-55 may include, wherein the security concern is accepted from a security application on a machine executing the application.

In Example 57, the subject matter of any of Examples 45-56 may include, wherein the security concern includes identification of a network location from which the application is loaded.

In Example 58, the subject matter of any of Examples 45-57 may include, wherein to determine the cache policy for the subset of application components includes determining to cache the subset of applications components based on a determination that it is not less efficient from at least one of a network resource or computational resource perspective to cache the subset of application components.

In Example 59, the subject matter of any of Examples 45-58 may include, wherein to determine the cache policy for the subset of application components includes overriding any determination to cache the subset of components based on a determination that a security status of the subset of application components is beyond a security threshold.

In Example 60, the subject matter of any of Examples 45-59 may include, wherein the cache improvement plan includes a division of the application into a plurality of sets of application components including the subset of application components, the division based on at least one of use of an application component or variability of the application component.

In Example 61, the subject matter of any of Examples 45-60 may include, wherein to provide the cache improvement plan includes aggregating a plurality of cache policies for the subset of application components.

In Example 62, the subject matter of any of Examples 45-61 may include, wherein the aggregating includes combining the plurality of cache policies to create an aggregate cache policy for the subset of application components.

In Example 63, the subject matter of any of Examples 45-62 may include, wherein to provide the cache improvement plan includes transmitting the cache improvement plan to a developer accessible network location.

In Example 64, the subject matter of any of Examples 45-63 may include a developer support platform, the developer support platform including: receipt means to receive the cache improvement plan; and segmentation means to provide a recommended modification to the application, the modification including dividing the application into a plurality of files, a subset of the plurality of files corresponding to the subset of application component In Example 65, the subject matter of any of Examples 45-64 may include recommendation means to create a crowd-sourced cache improvement plan from a plurality of cache improvement plans, wherein the receipt means receives the plurality of cache improvement plans from a plurality of users, the cache improvement plan being one of the plurality of cache improvement plans.

In Example 66, the subject matter of any of Examples 45-65 may include, wherein the crowd-sourced cache improvement plan is derived from a subset of the plurality of users and respective cache improvement plans, the subset selected based on a user behavior characteristic.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A machine readable medium that is not a transitory propagating signal, the machine readable medium including instructions that, when executed by a machine, cause the machine to perform operations comprising:
   identifying a received application and an application cache policy;
   executing the application according to the application cache policy;
   monitoring execution of the application to determine a behavior characteristic for a subset of application components, wherein the behavior characteristic is tracked via a cacheable score in which access to a part of a file from a member of the subset of application components increases the score and a change in content of the part of the file decreases the score;
   determining a cache policy for the subset of application components based on the monitoring, wherein determining the cache policy includes determining that a first part of a file the subset of application components has a cacheable score greater than a threshold and a second part of the file has a cacheable score less than the threshold, the policy indicating that the first part of the file is a candidate for caching and indicating that the second part of the file is not a candidate for caching;
   providing a cache improvement plan for the application based on the cache policy for the subset of application components;
   receiving a modification of the application and a new application cache policy, the modification being a division of the file of the application into a plurality of files based on the cache improvement plan, one of the plurality of files corresponding to the first part of the file and another of the plurality of files corresponding to the second part of the file, and the new application cache policy based on the cache policy; and
   executing the modification of the application according to the new application cache policy.

2. The machine readable medium of claim 1, wherein monitoring the execution of the application includes identifying components of the application.

3. The machine readable medium of claim 2, wherein identifying the components of the application includes identifying discrete data types within the application.

4. The machine readable medium of claim 2, wherein identifying the components of the application includes identifying portions of a discrete data type as a component.

5. The machine readable medium of claim 1, wherein at least one of the modification to the application or the new application cache policy results from aggregating a plurality of cache policies from different devices from different users for the subset of application components.

6. The machine readable medium of claim 5, wherein the aggregating includes combining the plurality of cache policies to create an aggregate cache policy for the subset of application components.

7. The machine readable medium of claim 1, wherein the operations further comprise:
   receiving the cache improvement plan; and
   providing a recommended modification to the application, the modification including dividing the application into a plurality of files, a subset of the plurality of files corresponding to the subset of application components.

8. The machine readable medium of claim 1, wherein the application cache policy includes a flag that indicates that cache policy improvement is requested for the application.

9. A system for crowd sourced distributed application cache management, the system comprising:
   an initiation module to identify a received application and an application cache policy;
   a processor to execute the application according to the application cache policy
   a profile module to monitor execution of the application to determine a behavior characteristic for a subset of application components, wherein the behavior characteristic is tracked via a cacheable score in which access to a part of a file from a member of the subset of application components increases the score and a change in content of the part of the file decreases the score;
   a dynamic cache policy module to determine a cache policy for the subset of application components based on the monitoring, wherein, to determine the cache policy, the dynamic cache policy module determines that a first part of a file the subset of application components has a cacheable score greater than a threshold and a second part of the file has a cacheable score less than the threshold, the policy indicating that the first part of the file is a candidate for caching and indicating that the second part of the file is not a candidate for caching;
a feedback module to provide a cache improvement plan for the application based on the cache policy for the subset of application components; and
a network interface to receive a modification of the application and a new application cache policy, wherein the modification is a division of the file of the application into a plurality of files based on the cache improvement plan, one of the plurality of files corresponding to the first part of the file and another of the plurality of files corresponding to the second part of the file, wherein the new application cache policy is based on the cache policy, and wherein the processor executes the modification of the application according to the new application cache policy.

10. The system of claim 9, wherein to monitor the execution of the application includes identifying components of the application.

11. The system of claim 10, wherein to identify the components of the application includes identifying discrete data types within the application.

12. The system of claim 10, wherein to identify the components of the application includes identifying portions of a discrete data type as a component.

13. The system of claim 9, wherein at least one of the modification to the application or the new application cache policy results from aggregating a plurality of cache policies from different devices from different users for the subset of application components.

14. The system of claim 13, wherein the aggregating includes combining the plurality of cache policies to create an aggregate cache policy for the subset of application components.

15. The system of claim 9, comprising a developer support platform, the developer support platform including:
a management module to receive the cache improvement plan; and
a segmentation module to provide a recommended modification to the application, the modification including dividing the application into a plurality of files, a subset of the plurality of files corresponding to the subset of application components.

16. The system of claim 9, wherein the application cache policy includes a flag that indicates that cache policy improvement is requested for the application.

17. A machine-implemented method for crowd sourced distributed application cache management, the method comprising:
identifying a received application and an application cache policy;
executing the application according to the application cache policy;
monitoring execution of the application to determine a behavior characteristic for a subset of application components, wherein the behavior characteristic is tracked via a cacheable score in which access to a part of a file from a member of the subset of application components increases the score and a change in content of the part of the file decreases the score;
determining a cache policy for the subset of application components based on the monitoring, wherein determining the cache policy includes determining that a first part of a file the subset of application components has a cacheable score greater than a threshold and a second part of the file has a cacheable score less than the threshold, the policy indicating that the first part of the file is a candidate for caching and indicating that the second part of the file is not a candidate for caching;
providing a cache improvement plan for the application based on the cache policy for the subset of application components;
receiving a modification of the application and a new application cache policy, the modification being a division of the file of the application into a plurality of files based on the cache improvement plan, one of the plurality of files corresponding to the first part of the file and another of the plurality of files corresponding to the second part of the file, and the new application cache policy based on the cache policy; and
executing the modification of the application according to the new application cache policy.

18. The method of claim 17, wherein monitoring the execution of the application includes identifying components of the application.

19. The method of claim 18, wherein identifying the components of the application includes identifying portions of a discrete data type as a component.

20. The method of claim 17, wherein at least one of the modification to the application or the new application cache policy results from aggregating a plurality of cache policies from different devices from different users for the subset of application components.

21. The method of claim 20, wherein the aggregating includes combining the plurality of cache policies to create an aggregate cache policy for the subset of application components.

22. The method of claim 17, wherein the application cache policy includes a flag that indicates that cache policy improvement is requested for the application.

* * * * *